United States Patent

Miyamura et al.

(10) Patent No.: US 12,218,381 B2
(45) Date of Patent: Feb. 4, 2025

(54) BATTERY AND ELECTRODE BODY HOLDER

(71) Applicant: Prime Planet Energy & Solutions, Inc., Tokyo (JP)

(72) Inventors: Yukinobu Miyamura, Kobe (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/876,532

(22) Filed: Jul. 29, 2022

(65) Prior Publication Data

US 2023/0039913 A1 Feb. 9, 2023

(30) Foreign Application Priority Data

Aug. 5, 2021 (JP) ................................. 2021-128815

(51) Int. Cl.
*H01M 50/46* (2021.01)
*H01M 10/04* (2006.01)
(Continued)

(52) U.S. Cl.
CPC ......... *H01M 50/46* (2021.01); *H01M 10/049* (2013.01); *H01M 50/184* (2021.01);
(Continued)

(58) Field of Classification Search
CPC ............ H01M 50/471; H01M 50/474; H01M 50/477; H01M 50/538; H01M 10/049
See application file for complete search history.

(56) References Cited

U.S. PATENT DOCUMENTS

2012/0052341 A1* 3/2012 Kim ................... H01M 50/147
429/186
2013/0040178 A1* 2/2013 Lim ................... H01M 50/147
429/149
(Continued)

FOREIGN PATENT DOCUMENTS

JP 2013-191544 A 9/2013
JP 2017-059507 A 3/2017
(Continued)

OTHER PUBLICATIONS

Espacenet machine translation of WO 2018/190016 A1 (Year: 2018).*
Espacenet machine translation of WO2021124796A1 (Year: 2021).*

*Primary Examiner* — Jonathan G Leong
*Assistant Examiner* — Katharine A Caughron
(74) *Attorney, Agent, or Firm* — HAUPTMAN HAM, LLP

(57) ABSTRACT

A battery is provided in which an electrode tab group is hardly damaged. In the herein disclosed battery, an electrode body includes an electrode body main body part, a positive electrode tab group protruding from a first end part, and a negative electrode tab group protruding from a second end part. The positive electrode tab group and the negative electrode tab group are folded and bent to make tip ends of electrode tabs respectively configuring these tab groups be arranged along a second side wall of the battery case. A portion of the folded and bent electrode tab is joined to the electrical collector body of the same pole. The battery includes a spacer between the electrode body main body part and the second side wall, and the spacer is to regulate movement of the electrode body.

12 Claims, 12 Drawing Sheets

(51) Int. Cl.
  *H01M 50/184* (2021.01)
  *H01M 50/466* (2021.01)
  *H01M 50/469* (2021.01)
  *H01M 50/538* (2021.01)

(52) U.S. Cl.
  CPC ....... *H01M 50/466* (2021.01); *H01M 50/469* (2021.01); *H01M 50/538* (2021.01)

(56) References Cited

U.S. PATENT DOCUMENTS

| | | | |
|---|---|---|---|
| 2013/0209859 A1 | 8/2013 | Tsuruta et al. | |
| 2016/0336576 A1* | 11/2016 | Shinoda | H01M 50/533 |
| 2019/0044102 A1 | 2/2019 | Ogawa et al. | |
| 2019/0260008 A1* | 8/2019 | Koike | H01M 10/0585 |
| 2020/0295339 A1* | 9/2020 | Kwak | H01M 10/0431 |
| 2022/0352606 A1 | 11/2022 | Wakimoto et al. | |

FOREIGN PATENT DOCUMENTS

| | | | | |
|---|---|---|---|---|
| JP | 201750069 A | 3/2017 | | |
| JP | 2020-119810 A | 8/2020 | | |
| WO | WO-2018190016 A1 * | 10/2018 | | |
| WO | 2021/060009 A1 | 4/2021 | | |
| WO | WO-2021124796 A1 * | 6/2021 | .......... | H01M 10/052 |

\* cited by examiner

BATTERY AND ELECTRODE BODY HOLDER

CROSS REFERENCE TO RELATED APPLICATIONS

The present application claims the priority based on Japanese Patent Application No. 2021-128815 filed on Aug. 5, 2021, the entire contents of which are incorporated in the present specification by reference.

BACKGROUND OF THE DISCLOSURE

1. Technical Field

The present disclosure relates to a battery and an electrode body holder.

2. Background

A battery such as a lithium ion secondary battery, generally includes an electrode body including an electrode, an outer package including an opening part and accommodating the electrode body, a sealing plate sealing the opening part of the outer package, a terminal being electrically connected to the electrode at the inside of the outer package and extending from the sealing plate to the outside of the outer package, and an electrical collector body electrically connecting the electrode body and the terminal. Regarding this type of the battery, a configuration is typically known in which an electrode tab group including a plurality of electrode tabs for electrical collector is provided on the electrode and in which the electrode is connected to the terminal through the electrode tab group.

Japanese Patent Application Publication No. 2017-50069 discloses a battery in which a positive electrode tab and a negative electrode tab are respectively provided at the opposite end parts of the electrode assembly (electrode body) in the width direction. In this Japanese Patent Application Publication, these electrode tabs are folded and bent along the end surface in the width direction of the electrode assembly, and the folded and bent part of the electrode tab is connected (joined) to the electrical collector body.

SUMMARY OF THE INVENTION

Anyway, regarding the battery, it would be happened that vibration, impact, or the like is applied to the battery from the outside. The electrode tab is, for example, configured with a part of the electrode core body, is soft, and is often affected by the external force. For example, when the external force is applied to the electrode tab group from the width direction of the electrode body, the electrode body is deviated from the predetermined arrangement position, and then the electrode tab group (positive electrode tab group and/or negative electrode tab group) might be drawn in the same direction or might be pressed by the electrode body or the inner wall of the outer package. Applying such a load on the electrode tab group would cause the damage on the electrode tab group, and thus it is not preferable. Damaging the electrode tab group would cause some fears of making the electrical connection between the electrode and the terminal be unstable or inducing connection failure.

The present disclosure has been made in view of the above described circumstances, and the object is to provide a battery in which the electrode tab group is hardly damaged.

According to the herein disclosed technique, it is possible to provide a battery, including an outer package that includes a bottom wall, a pair of first side walls extending from the above described bottom wall and being mutually opposed, a pair of second side walls extending from the above described bottom wall and being mutually opposed, and an opening part opposed to the above described bottom wall, including a sealing plate that seals the above described opening part, including one or a plurality of electrode bodies that are accommodated in the above described outer package and that each includes a positive electrode and a negative electrode, including a positive electrode terminal and a negative electrode terminal that are attached to the above described sealing plate, including a positive electrode electrical collector body that electrically connects the above described positive electrode of the above described electrode body and the above described positive electrode terminal, and including a negative electrode electrical collector body that electrically connects the above described negative electrode of the above described electrode body and the above described negative electrode terminal. The above described electrode body includes an electrode body main body part, includes a positive electrode tab group including a plurality of positive electrode tabs protruding from a first end part of the above described electrode body main body part in a first direction along the above described first side wall, and includes a negative electrode tab group including a plurality of negative electrode tabs protruding from a second end part of the above described electrode pair main body part in the above described first direction, the above described second end part being different from the above described first end part. Here, the above described positive electrode tab group is folded and bent to arrange respective tip ends of the above described positive electrode tabs configuring the above described positive electrode tab group along the above described second side wall, and a portion of the above described folded and bent positive electrode tabs is joined to the above described positive electrode electrical collector body. The above described negative electrode tab group is folded and bent to arrange respective tip ends of the above described negative electrode tabs configuring the above described negative electrode tab group along the above described second side wall, and a portion of the folded and bent negative electrode tabs is joined to the above described negative electrode electrical collector body. A spacer is provided between the above described electrode body main body part and the above described second side wall that regulates movement of the above described electrode body.

The battery configured as described above includes the spacer arranged between the electrode body main body part and the second side wall that regulates the movement of the electrode body, and thus it is possible to suppress the movement (especially, movement in the above described first direction) of the electrode body inside the outer package even when the external force, such as vibration and impact, is applied to the battery from the outside. Therefore, it is possible to suppressing the movement of the electrode body as described above from causing the load applied to the electrode tab group, so as to suppress the damage on the electrode tab group. Incidentally, below, the wordings "positive electrode tab" and "negative electrode tab" in the present specification might be referred to as "electrode tab" when the distinction of positive or negative is not particularly emphasized. About "electrode electrical collector body", referring might be performed similarly.

According to one preferable aspect of the herein disclosed battery, the above described spacer includes a spacer main body part that is arranged between the above described positive electrode tab group and the above described positive electrode electrical collector body, or the above described negative electrode tab group and the above described negative electrode electrical collector body. In accordance with such a configuration, the spacer main body part is arranged between the electrode tab group and the electrode electrical collector body, and thus it is possible to more efficiently implement the damage suppressing effect on the electrode tab group.

According to another preferable aspect, in the above described battery, the electrode body exists plural in the outer package. In the above described battery, the above described spacer main body part exists plural. Each spacer main body part is arranged between the above described positive electrode tab group of each electrode body and the above described positive electrode electrical collector body, or between the above described negative electrode tab group of each electrode body and the above described negative electrode electrical collector body. A coupled part in which one ends of respective spacer main body parts are mutually coupled is formed. In accordance with such a configuration, it is possible in addition to the above described effect to reduce the arrangement (insertion) number of the spacer main body part during the battery manufacture step.

According to another preferable aspect, the above described coupled part is arranged at a side of the above described sealing plate or a side of the above described bottom wall. In accordance with such a configuration, it is possible in addition to the above described effect to suppress the spacer main body part from falling off.

In addition, according to another aspect of the herein disclosed battery, the above described spacer is arranged between the above described positive electrode tab group and the above described bottom wall, or between the above described negative electrode tab group and the above described bottom wall. In accordance with such a configuration, it is possible to more efficiently suppress the movement of the electrode body. By the movement suppressing effect of the electrode body as described above, it is possible to implement the damage suppressing effect on the electrode tab group.

According to another aspect, the above described spacer is formed in a rectangular parallelopiped shape. In accordance with such a configuration, it is possible to more efficiently suppress the movement of the electrode body. By the movement suppressing effect of the electrode body as described above, it is possible to implement the damage suppressing effect of the electrode tab group.

In addition, preferably, the above described spacer includes a plate part being rectangular, and two first erectly provided parts being erectly provided in a same direction respectively from a pair of opposed sides of the above described plate part. The above described two first erectly provided parts are opposed to the first side wall. End parts of the above described two first erectly provided parts in the above described erectly provided direction are opposed to the above described second side wall. In accordance with such a configuration, it is possible in addition to the above described effect to increase the internal space of the outer package. Thus, it is possible to increase the injection amount of the electrolyte. In addition, it is possible to suppress the increase of the internal pressure at the gas generating time.

In addition, preferably, the above described two first erectly provided parts include extending parts that extend in an extending direction of the above described pair of sides of the above described plate part. In accordance with such a configuration, it is possible in addition to the above described effect to more efficiently impregnate the electrode body with the electrolyte.

In addition, preferably, the above described spacer includes a plate part that is rectangular, a second erectly provided part that is erectly provided from a side of the above described plate part, and a supporting plate part that extends in a direction parallel to the above described plate part from the above described second erectly provided part. A length of the above described supporting plate part in a direction where the above described supporting plate part extends is shorter than a length of the above described plate part in the same direction. The above described second erectly provided part is arranged at the above described side of the above described sealing plate. The above described plate part is opposed to the above described second side wall. The above described supporting plate part is opposed to the above described electrode body main body part. In accordance with such a configuration, it is possible to provide the spring properly on the spacer. Thus, it is possible to more efficiently implement the movement suppressing effect of the electrode body.

In addition, according to the herein disclosed technique, an electrode body holder is provided that accommodates one or plural electrode bodies accommodated in a battery case. This electrode body holder includes an internal space for accommodating the above described one or plural electrode bodies. This electrode body holder includes an opening part that communicates with the above described internal space, a bottom surface that is rectangular and that is opposed to the above described opening part, a pair of width wide surfaces that extend from the above described bottom surface and that are mutually opposed, and a pair of width narrow surfaces that extend from the above described bottom surface and that are mutually opposed. This electrode body holder is what a film made of resin is folded and bent and is shaped. At least one among the above described pair of width narrow surfaces includes a spacer that regulates movement of the above described electrode body inside the above described electrode body holder. In accordance with such a configuration, it is possible to provide the movement suppressing effect of the electrode body on the electrode body holder, so as to implement the damage suppressing effect of the electrode tab group.

In addition, according to one preferable aspect of the herein disclosed electrode body holder, the above described spacer is formed by folding and bending at least one part of a width narrow surface forming part being adjacent to a portion configuring the above described width wide surface and forming the above described width narrow surface, to an inward of the above described electrode body holder, of the above described film. In accordance with such a configuration, for arranging the spacer, it is not required to add a member other than the above described film. Therefore, it is possible to facilitate manufacturing the above described electrode body holder.

In addition, according to another preferable aspect of the above described electrode body holder, the above described spacer is formed by folding and bending at least one part of the above described bottom surface adjacent part adjacent to a portion configuring the above described bottom surface, to an inward of the above described electrode body holder, of the above described film. In accordance with such a configuration, it is possible in addition to the above described effect to more uniformly press the electrode body by the spacer.

In addition, according to another preferable aspect of the above described electrode body holder, the above described spacer is formed in a cylindrical shape, and is configured with a resin sheet different from the above described film, in accordance with such a configuration, it is possible in addition to the above described effect to use different configuration materials for the electrode body holder and the spacer. In addition, it is possible to further facilitate adjusting the thickness of the spacer.

In addition, according to the herein disclosed technique, a battery is provided which includes one or plural electrode bodies, and an electrode body holder that accommodates the above described electrode bodies. This battery includes the above described electrode body holder. In accordance with such a configuration, it is possible to provide a battery in which the movement suppressing effect for the electrode body, consequently the damage suppressing effect on the electrode tab group have been suitably implemented.

DETAILED DESCRIPTION OF THE PREFERRED EMBODIMENTS

Below, while referring to drawings, several preferred embodiments of herein disclosed techniques will be explained. Incidentally, the matters other than matters particularly mentioned in this specification, and required for practicing the present disclosure (for example, a general configuration and a general manufacture process of the battery (secondary battery in the herein disclosed technique) that do not characterize the herein disclosed technique) can be grasped as design matters of those skilled in the art based on the related art in the present field. The herein disclosed technique can be executed based on the contents disclosed in the present specification, and the technical common sense in the present field.

In the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor. In the present specification, the secondary battery might be simply referred to as "battery" too.

Embodiment 1

Figure 1:
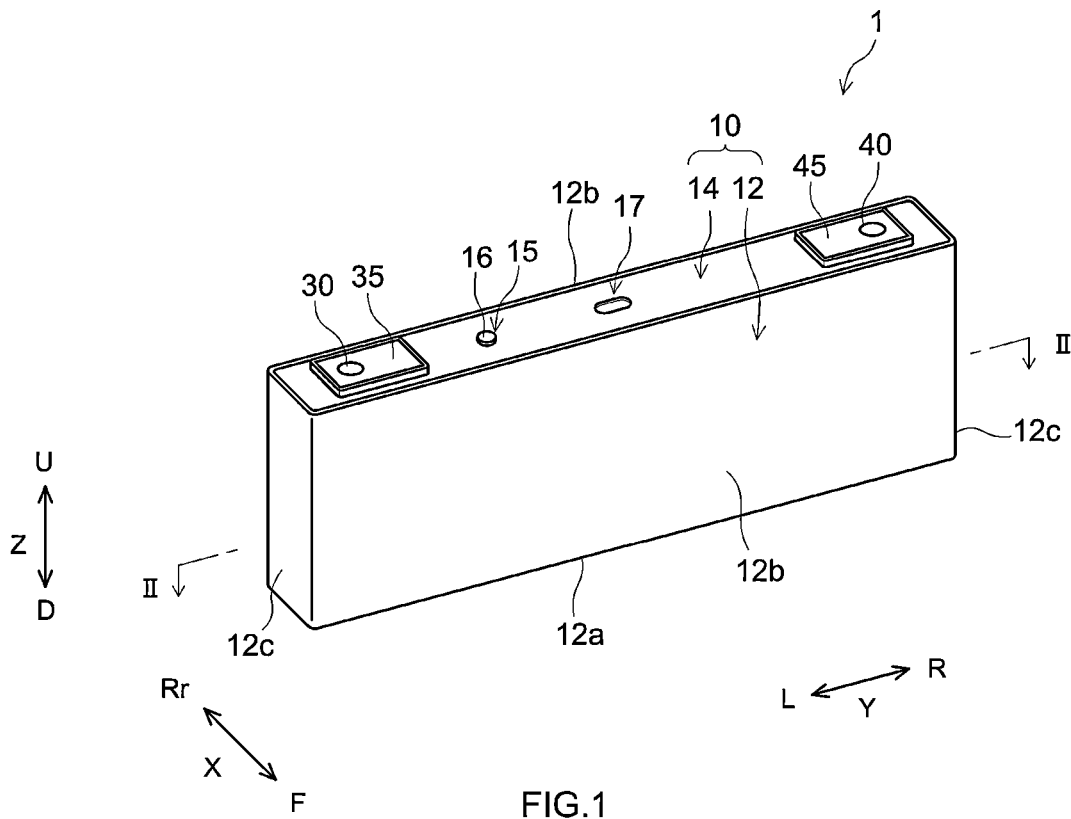
FIG. 1 is a perspective view that schematically shows a battery 1 in accordance with Embodiment 1.
Figure 2:
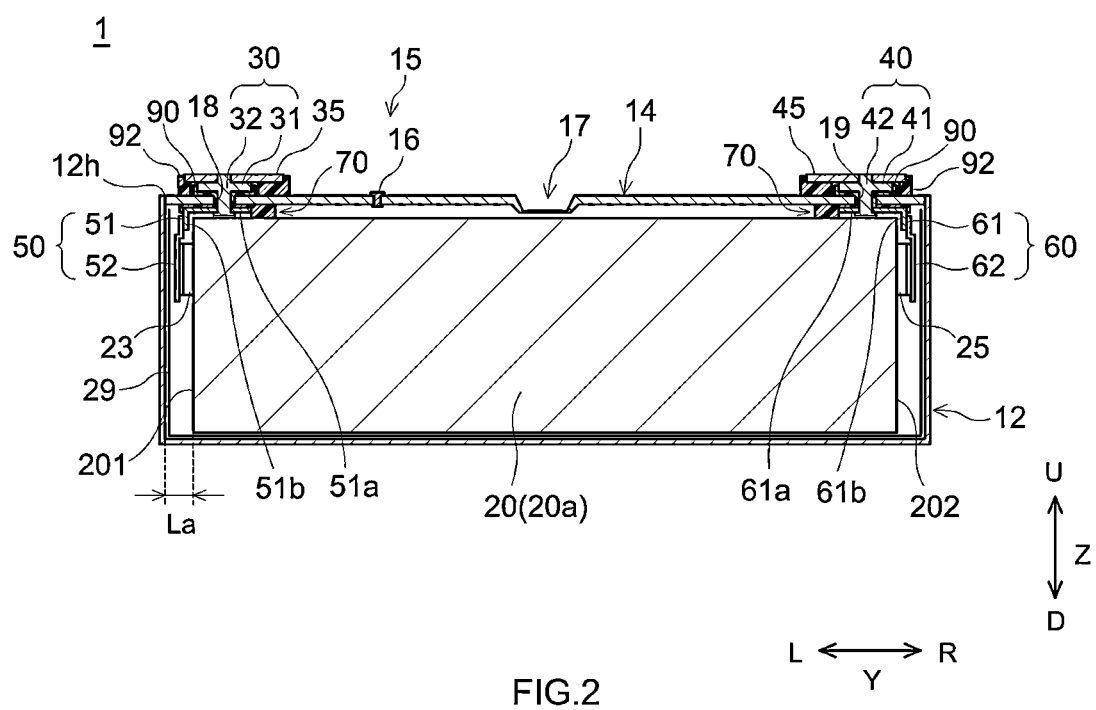
FIG. 2 is a cross sectional view that is schematically shown along the II-II line of FIG. 1.

FIG. 1 is a perspective view that schematically shows a battery 1 in accordance with Embodiment 1. FIG. 2 is a cross sectional view that is schematically shown along the II-II line of FIG. 1. Additionally, in drawings referred by the present specification, the reference sign X represents the "depth direction", the reference sign Y represents the "width direction", and the reference sign Z represents the "height direction". Additionally, in the depth direction X, F represents the "front" and Rr represents the "rear". In the width direction Y, L represents the "left" and R represents the "right". Then, in the height direction Z, U represents the "up" and D represents the "down". However, these are merely directions for convenience sake of explanation, which never restrict the disposed form of the battery 1.

As shown in FIGS. 1 and 2, the battery 1 includes a battery case 10, an electrode body 20, a positive electrode terminal 30, a negative electrode terminal 40, a positive electrode electrical collector body 50, a negative electrode electrical collector body 60, an insulator 70, and a gasket 90. As the illustration is omitted, the battery 1 herein includes an electrolyte, too. The battery 1 herein is a lithium ion secondary battery.

The battery case 10 is a housing that accommodates the electrode body 20. The battery case 10 has an appearance that is herein a flat and bottomed rectangular parallelopiped shape (square shape). It is enough that the material of the battery case 10 is the same as conventionally used one, which is not particularly restricted. It is preferable that the battery case 10 is made of metal, and it is further preferable that the battery case is made of, for example, aluminum, aluminum alloy, iron, iron alloy, or the like. Incidentally, not only the electrode body 20 but also the electrolyte (the illustration is omitted) are accommodated inside the battery case 10. Regarding the electrolyte as described above, one used for the lithium ion secondary battery can be used without particular restriction. The electrolyte does not characterize the herein disclosed technique, and thus the detailed explanation about the electrolyte is omitted.

The battery case 10 includes an outer package 12 including an opening part 12h, and includes a sealing plate (lid body) 14 covering the opening part 12h. As shown in FIG. 1, the outer package 12 includes a bottom wall 12a formed in a flat surface rectangular shape, a pair of longer side walls 12b respectively extending from long sides of the bottom wall 12a in the height direction Z and being mutually opposed, and a pair of shorter side walls 12c extending from short sides of the bottom wall 12a in the height direction and being mutually opposed. The longer side wall 12b is an example of the first side wall of the herein disclosed battery. The shorter side wall 12c is an example of the second side wall of the herein disclosed battery. The bottom wall 12a is opposed to the opening part 12h. The area of the shorter side wall 12c is smaller than the area of the longer side wall 12b. The sealing plate 14 seals the opening part 12h of the outer package 12. The sealing plate 14 is opposed to the bottom wall 12a of the outer package 12. A plane view of the sealing plate 14 is approximately rectangular. The battery case 10 is integrated by joining the sealing plate 14 on the circumferential edge of the opening part 12h of the outer package 12. The battery case 10 is airtightly sealed (airtightly closed).

The sealing plate 14 is provided with a liquid injection hole 15, a gas exhaust valve 17, and two terminal taking out holes 18 and 19. The liquid injection hole 15 is for performing liquid injection of the electrolyte, after the sealing plate 14 is assembled with the outer package 12. The liquid injection hole 15 is sealed by a seal member 16. The gas exhaust valve 17 is a thin-walled part configured to be broken and then exhaust the gas in the battery case 10 to the outside when the pressure in the battery case 10 becomes equal to or more than a predetermined value. The terminal taking out holes 18 and 19 are respectively formed at the opposite ends of the sealing plate 14 in the width direction Y. The terminal taking out holes 18 and 19 penetrate the sealing plate 14 in the height direction Z. The terminal taking out holes 18 and 19 respectively have inner diameters capable of inserting the positive electrode terminal 30 and the negative electrode terminal 40 before attached to the sealing plate 14 (before the caulking process).

The positive electrode terminal 30 and the negative electrode terminal 40 both are attached to the sealing plate 14. The positive electrode terminal 30 is arranged at the one side of the sealing plate 14 in the width direction Y (left side in FIG. 1 and FIG. 2). The negative electrode terminal 40 is arranged at the other side of the sealing plate 14 in the width direction Y (fight side in FIG. 1 and FIG. 2). For example, aluminum or the like is used for the positive electrode terminal 30. For example, copper or the like is used for the negative electrode terminal 40.

The positive electrode terminal 30 includes a flat plate-shaped basal part 31 that is arranged on the outside surface of the sealing plate 14, and includes a shaft part 32 that extends from the basal part 31 to the lower side (bottom wall 12a side) in the height direction Z. The basal part 31 of the positive electrode terminal 30 is exposed on the outside surface of the sealing plate 14. The shaft part 32 of the positive electrode terminal 30 is inserted into the terminal taking out hole 18 so as to extend from the outside to the inside of the sealing plate 14. Inside the battery case 10, the shaft part 32 is inserted into a penetration hole of a positive electrode first electrical collector part 51 of a positive electrode electrical collector body 50 described later so as to be fixed to the positive electrode first electrical collector part 51. The positive electrode terminal 30 herein is fixed by the caulking process to the circumferential edge portion surrounding the terminal taking out hole 18 of the sealing plate 14. Incidentally, in the battery 1, the negative electrode terminal 40 also includes a structure approximately similar to the positive electrode terminal 30. Thus, regarding the structure of the negative electrode terminal 40, detailed illustrations and explanations are omitted. In FIG. 2, the reference sign 41 represents a basal part of the negative electrode terminal 40, and the reference sign 42 represents a shaft part.

On the outside surface of the sealing plate 14, a plate-shaped positive electrode outside electrically conductive member 35 and negative electrode outside electrically conductive member 45 are attached. The positive electrode outside electrically conductive member 35 is electrically connected to the positive electrode terminal 30. The negative electrode outside electrically conductive member 45 is electrically connected to the negative electrode terminal 40. The positive electrode outside electrically conductive member 35 and the negative electrode outside electrically conductive member 45 each is a member on which a bus bar is attached when a plurality of batteries 1 are mutually and electrically connected. The positive electrode outside electrically conductive member 35 and the negative electrode outside electrically conductive member 45 are made of, for example, aluminum or aluminum alloy. The positive electrode outside electrically conductive member 35 and the negative electrode outside electrically conductive member 45 are insulated from the sealing plate 14 by an outside insulating member 92. However, the positive electrode outside electrically conductive member 35 and the negative electrode outside electrically conductive member 45 are not essential, and thus they might be omitted in another embodiment. Incidentally, as for the configuration material of the outside insulating member 92, a resin material mentioned as the configuration material of a later described insulator 70 or gasket 90 can be used.

The insulator 70 is arranged between the positive electrode electrical collector body 50 (for more details, terminal connecting part 51a of the positive electrode first electrical collector part 51) and the inside surface of the sealing plate 14. On the insulator 70, a penetration hole is formed. The gasket 90 is arranged between the positive electrode terminal 30 (for more details, basal part 31) and the outside surface of the sealing plate 14. The gasket 90 includes a cylindrical projection that is inserted into the terminal taking out hole 18 of the sealing plate 14. The projection of the gasket 90 as described above is arranged along the inner periphery of the penetration hole of the insulator 70. Providing the insulator 70 and gasket 90 configured as described above can inhibit the contact of the positive electrode electrical collector body 50 and the sealing plate 14, and can inhibit the contact of the positive electrode terminal 30 and the sealing plate 14. Incidentally, a structure similar to the insulation structure using the insulator and the gasket is provided even at the negative electrode terminal 40 side, but the detailed explanation is omitted. Incidentally, the configuration materials of the insulator 70 and the gasket 90, which are not particularly restricted, might be resin materials, such as polyolefin resin (for example, polypropylene (PP) or polyethylene (PE)), fluorine resin (for example, perfluoro alkoxy alkane (PFA), and polytetrafluoroethylene (PTFE)).

Figure 3:
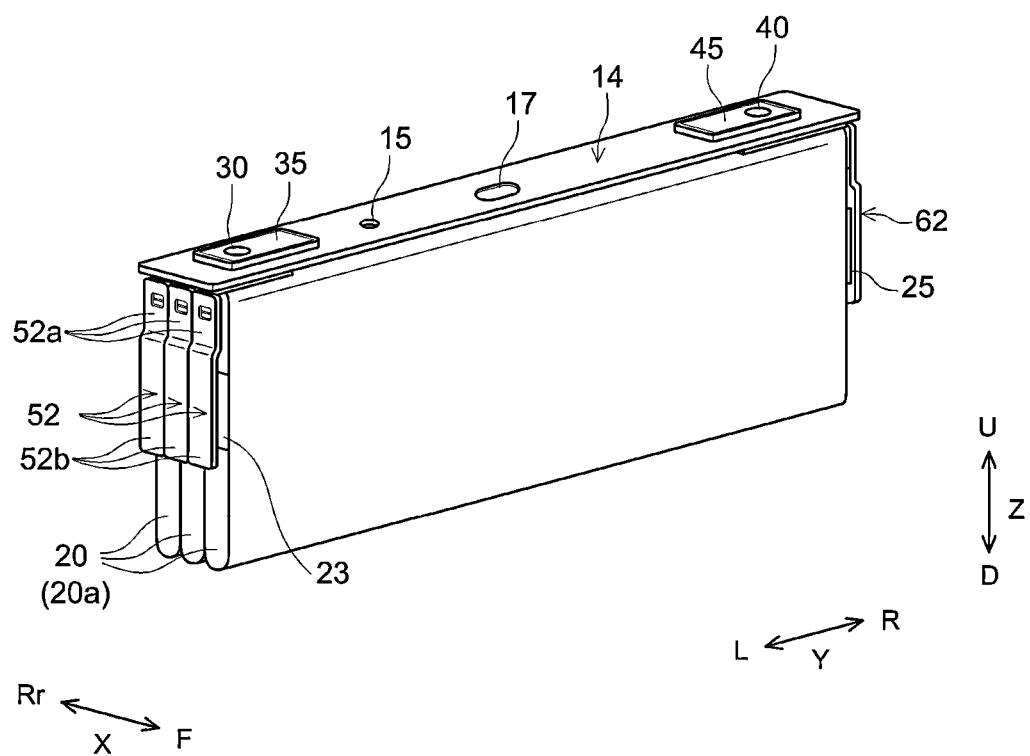
FIG. 3 is a perspective view that schematically shows an electrode body 20 attached to a sealing plate 14.
Figure 4:
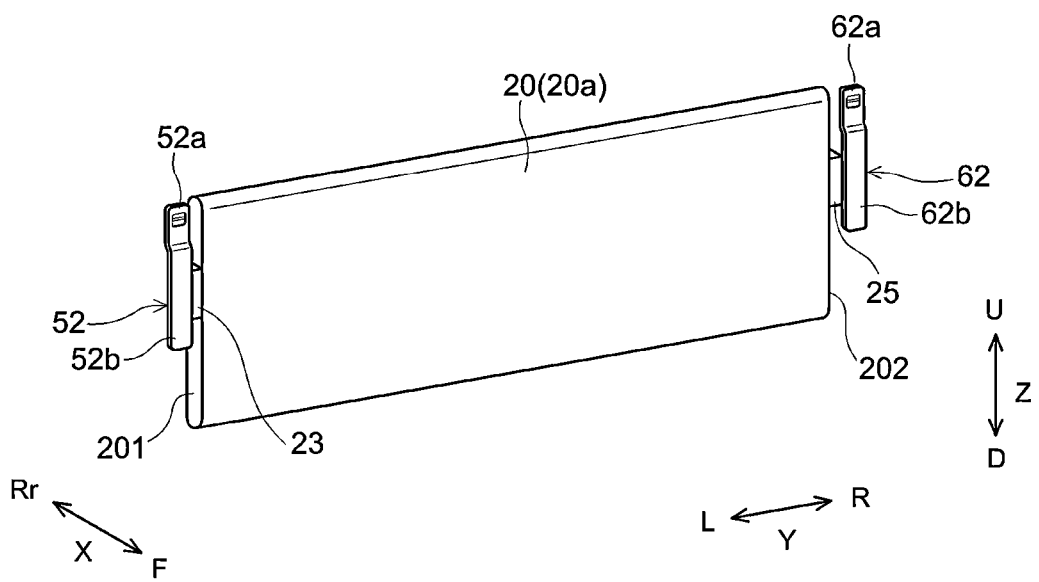
FIG. 4 is a perspective view that schematically shows the electrode body 20 to which a part of a positive electrode electrical collector body 50 and a part of a negative electrode electrical collector body 60 are attached.

FIG. 3 is a perspective view that schematically shows an electrode body 20 attached to a sealing plate 14. FIG. 4 is a perspective view that schematically shows the electrode body 20 to which a part of a positive electrode electrical collector body 50 and a part of a negative electrode electrical collector body 60 are attached. The battery 1 includes one or a plurality of electrode bodies 20, and the present embodiment includes three electrode bodies 20, as shown in FIG. 3. The electrode body 20 is arranged inside the outer package 12 in a state that the electrode body is covered by an electrode body holder 29 consisting of a resin-made sheet, the resin being polyethylene (PE) or the like (see FIG. 2). As shown in FIGS. 2 to 4, inside the outer package 12, the battery 1 includes the positive electrode electrical collector body 50 that electrically connects the positive electrode of the electrode body 20 and the positive electrode terminal 30, and includes the negative electrode electrical collector body 60 that electrically connects the negative electrode of the electrode body 20 and the negative electrode terminal 40.

Figure 5:
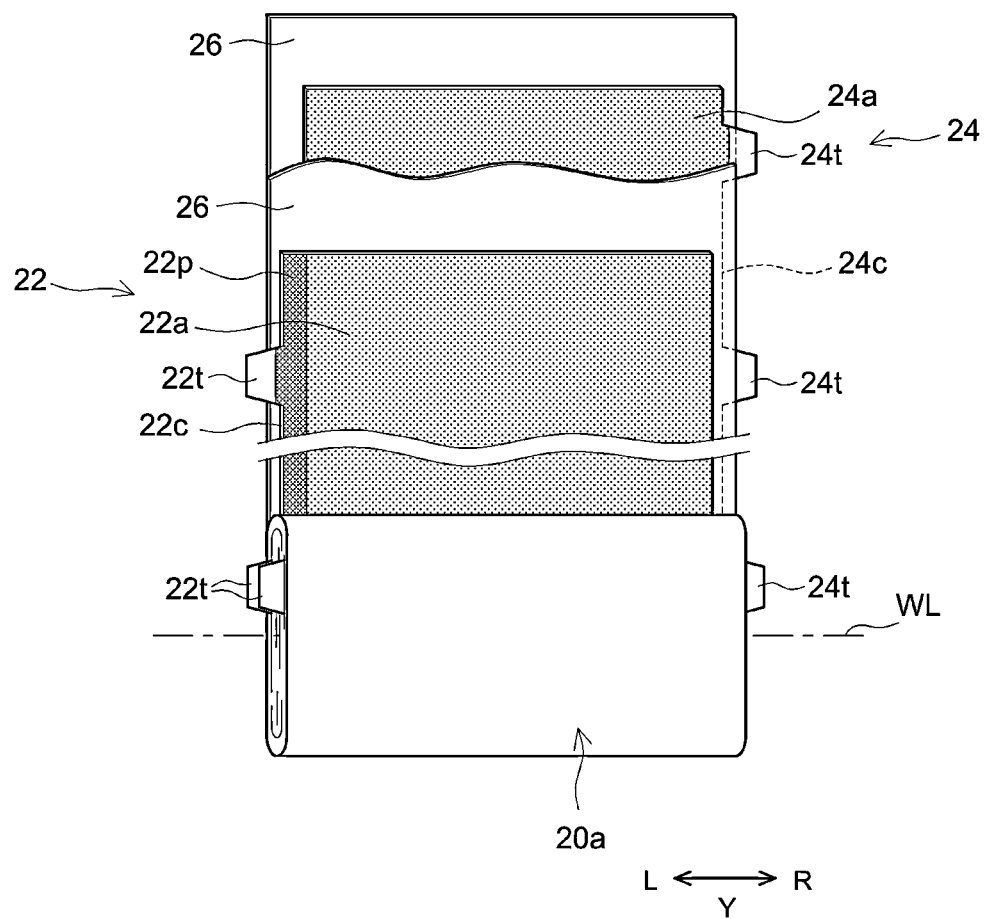
FIG. 5 is a schematic view that shows a configuration of the electrode body 20.

FIG. 5 is a schematic view that shows a configuration of the electrode body 20. As shown in FIG. 5, the electrode body 20 includes a positive electrode and a negative electrode (positive electrode plate 22 and negative electrode plate 24 in FIG. 5). The electrode body 20 herein is a flat-shaped wound electrode body in which the strip-shaped positive electrode plate 22 and the strip-shaped negative electrode plate 24 are laminated via a strip-shaped separator 26 to be wound therein with the winding axis WL being as the center. The electrode body 20 includes an electrode body main body part 20*a*, a positive electrode tab group 23, and a negative electrode tab group 25 (see FIGS. 2 to 4). The electrode body main body part 20*a* is a portion in which the positive electrode plate 22, the negative electrode plate 24, and the separator 26 are laminated, and which is formed in a flat shape as shown in FIGS. 3 to 5. Incidentally, regarding the configuration materials of the positive electrode plate 22, negative electrode plate 24, and separator 26, materials used for this kind of lithium ion secondary battery can be used without particular restriction. The configuration materials as described above do not characterize the herein disclosed technique, and the detailed explanations are omitted.

As shown in FIGS. 1, 2, and 5, the electrode body 20 is arranged inside the outer package 12 with the winding axis WL being parallel to the width direction Y In other words, the electrode body 20 is arranged inside the outer package 12 with the winding axis WL being parallel to the bottom wall 12*a* and being orthogonal to the shorter side wall 12*c*. Then, the both end surfaces of the electrode body 20 in a direction along the winding axis WL (in other words, width direction Y in FIG. 5) are opposed to the shorter side walls 12*c* of the outer package 12. In the present specification, for convenience sake of explanation, an end part of the electrode body 20 (electrode body main body part 20*a*) opposed to the shorter side wall 12*c* at the side (left side in the width direction Y of FIG. 2) close to the positive electrode electrical collector body 50 is referred to as the "first end part 201". Then, an end part of the electrode body 20 (electrode body main body part 20*a*) opposed to the shorter side wall 12*c* at the side (right side in the width direction Y of FIG. 2) close to the negative electrode electrical collector body 60 is referred to as the "second end part 202".

As shown in FIG. 5, the positive electrode plate 22 is a long strip-shaped member. The positive electrode plate 22 as described above includes a positive electrode collector foil 22*c* and a positive electrode active material layer 22*a* that is fixed on at least one surface of the positive electrode collector foil 22*c*. Although not particularly restricting, a positive electrode protective layer 22*p* might be provided, as needed, at one of the side edge parts of the positive electrode plate 22 in the width direction Y.

A plurality of positive electrode tabs 22*t* are provided at one of the end parts (left end part in FIG. 5) of the strip-shaped positive electrode collector foil 22*c* in the width direction Y. The plurality of positive electrode tabs 22*t* each protrudes toward one side (left side in FIG. 5) in the width direction Y The plurality of positive electrode tabs 22*t* protrude toward the outside in the width direction Y more than the separator 26. The plurality of positive electrode tabs 22*t* are provided at the intervals (intermittently) along the longitudinal direction of the positive electrode plate 22. The plurality of positive electrode tabs 22*t* each is formed in a trapezoidal shape. The positive electrode tab 22*t* herein is a part of the positive electrode collector foil 22*c* and consists of metal foil (e.g., aluminum foil). The positive electrode tab 22*t* is a portion (electrical collector foil exposed part) where neither the positive electrode active material layer 22*a* of the positive electrode collector foil 22*c* nor the positive electrode protective layer 22*p* are formed. However, the positive electrode tab 22*t* might be a member different from the positive electrode collector foil 22*c*.

Similarly to the positive electrode plate 22, the negative electrode plate 24 is also a long strip-shaped member. As shown in FIG. 5, the negative electrode plate 24 includes a negative electrode collector foil 24*c* and a negative electrode active material layer 24*a* that is fixed on at least one surface of the negative electrode collector foil 24*c*.

A plurality of negative electrode tabs 24*t* are provided at one of end parts (right end part in FIG. 5) of the strip-shaped negative electrode collector foil 24*c* in the width direction Y The plurality of negative electrode tabs 24*t* protrude toward one side (right side in FIG. 5) in the width direction Y The plurality of negative electrode tabs 24*t* protrude toward the outside in the width direction Y more than the separator 26. The plurality of negative electrode tabs 24*t* are provided at the intervals (intermittently) along the longitudinal direction of the negative electrode plate 24. The plurality of negative electrode tabs 24*t* each is formed in a trapezoidal shape. The negative electrode tab 24*t* herein is a part of the negative electrode collector foil 24*c* and consists of metal foil (e.g., copper foil). The negative electrode tab 24*t* herein is a portion (electrical collector foil exposed part) where the negative electrode active material layer 24*a* of the negative electrode collector foil 24*c* is not formed. However, the negative electrode tab 24*t* might be a member different from the negative electrode collector foil 24*c*.

Figure 6:
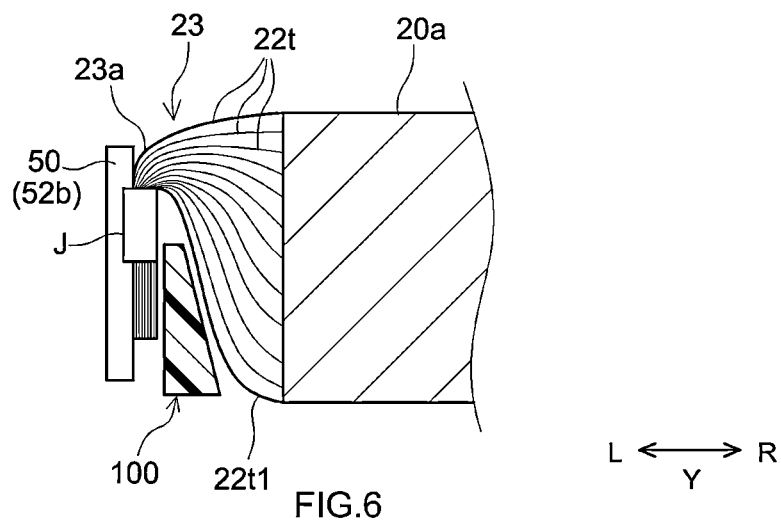
FIG. 6 is a partial cross-section view that is for explaining the join of a positive electrode tab group 23 and a positive electrode electrical collector body 50 and that is viewed from the sealing plate 14 side.

When the above described winding is performed, the plurality of positive electrode tabs 22*t* protruding from the first end part 201 of the electrode body main body part 20*a* are laminated so as to form the positive electrode tab group 23 including the plurality of positive electrode tabs 22*t*. FIG. 6 is a partial cross-section view that is for explaining the join of a positive electrode tab group 23 and a positive electrode electrical collector body 50 and that is viewed from the sealing plate 14 side. As shown in FIGS. 1 to 6, folding and bending are performed to make the tip end of each positive electrode tab 22*t* configuring the positive electrode tab group 23 be arranged along the shorter side wall 12c. By folding and bending as described above, a positive electrode folded and bent part 23a is formed at the positive electrode tab group 23. In addition, a portion of the folded and beat positive electrode tab 22t is joined to the positive electrode electrical collector body 50 (in particular, tab join part 52b). In particular, a portion of the positive electrode tab 22t being closer to the tip end than the positive electrode folded and bent part 23a is joined to the positive electrode electrical collector body 50, so as to form a join part J of the positive electrode tab 22t and positive electrode electrical collector body 50. Incidentally, regarding the means for joining as described above, for example, it is possible to use ultrasonic welding, resistance welding, laser welding, or the like (the same can be applied to the negative electrode).

In addition, when the above described winding is performed, the plurality of negative electrode tabs 24t protruding from the second end part 202 of the electrode body main body part 20a are laminated so as to form the negative electrode tab group 25 including the plurality of negative electrode tabs 24t. Although the detailed illustration is omitted, folding and bending are performed to make the tip end of each negative electrode tab 24t configuring the negative electrode tab group 25 be arranged along the shorter side wall 12c. By folding and bending as described above, a negative electrode folded and bent part is formed at the negative electrode tab group 25. In addition, a portion of the folded and bent negative electrode tab 24t is joined to the negative electrode electrical collector body 60 (in particular, tab join part 62b). In particular, a portion of the negative electrode tab 24t being closer to the tip end than the negative electrode folded and bent part is joined to the negative electrode electrical collector body 60, so as to form a join part of the negative electrode tab 24t and the negative electrode tab group 25.

As shown in FIG. 2, the positive electrode electrical collector body 50 includes a positive electrode first electrical collector part 51 and a positive electrode second collector part 52. The positive electrode first electrical collector part 51 is formed to have the letter "L" shaped cross section. The positive electrode first electrical collector part 51 includes a terminal connecting part 51a arranged along the inside surface of the sealing plate 14, and includes a lead part 51b extending from one end part of the terminal connecting part 51a in the width direction Y to the bottom wall 12a. On the terminal connecting part 51a, a penetration hole is formed at a position corresponding to the terminal taking out hole 18 of the sealing plate 14. Into the penetration hole, the shaft part 32 of the positive electrode terminal 30 is inserted.

As shown in FIGS. 2 to 4, the positive electrode second collector part 52 extends toward the bottom wall 12a of the outer package 12. The positive electrode second collector part 52 includes a first electrical collector part connecting part 52a and a tab join part 52b. The first electrical collector part connecting part 52a is a portion electrically connected to the positive electrode first electrical collector part 51. The first electrical collector part connecting part 52a extends along the vertical direction Z. The first electrical collector part connecting part 52a is arranged in a manner almost perpendicular to the winding axis WL of each electrode body 20. The tab join part 52b is a portion attached to the positive electrode tab group 23 and joined with the plurality of positive electrode tabs 22t. The tab join part 52b extends along the vertical direction Z. The tab join part 52b is arranged in a manner almost perpendicular to the winding axis WL of each electrode body 20. The surface connected to the plurality of positive electrode tabs 22t of the tab join part 52b is arranged in approximately parallel to the shorter side wall 12c of the outer package 12.

As shown in FIGS. 2 to 4, the negative electrode electrical collector body 60 includes a negative electrode first electrical collector part 61 and a negative electrode second collector part 62. The negative electrode first electrical collector part 61 includes a terminal connecting part 61a and a lead part 61b. The negative electrode second collector part 62 includes a first electrical collector part connecting part 62a and a tab join part 62b. The configuration of the negative electrode electrical collector body 60 is similar to the above described configuration of the positive electrode electrical collector body 50, and thus the detailed explanation is omitted here.

The battery 1 includes a spacer that is located between the electrode body main body part 20a and the shorter side wall 12c and that regulates the movement of the electrode body 20. By arranging the spacer at the portion as described above, it is possible to suppress the movement (especially, movement in the width direction Y) of the electrode body in the outer package even in the case where the external force, such as vibration and impact, is applied to the battery 1. Thus, it is possible to suppress the situation where the load is applied to the electrode tab h the movement of the electrode body as described above, and to suppress the damage on the electrode tab group.

For example, regarding the above described spacer, the battery 1 includes at least one among a spacer arranged between the first end part 201 of the electrode body main body part 20a and the shorter side wall 12c (e.g., first spacer arranged at the positive electrode side) and a spacer arranged between the second end part 202 of the electrode body main body part 20a and the shorter side wall 12c (e.g., second spacer arranged at the negative electrode side). In the case where the positive electrode tab 22t is configured with a material more breakable than the negative electrode tab 24t, it is preferable that the spacer is provided at least at the positive electrode side. The battery 1 might include both of the above described first spacer and the above described second spacer. The similar configuration can be applied to the below described Embodiment 2, too.

Figure 7:
FIG. 7 is a perspective view that shows a spacer main body part 100 used in Embodiment 1.

In the present embodiment, regarding the above described spacer, the battery 1 includes a spacer main body part 100 arranged between the positive electrode tab group 23 and the positive electrode electrical collector body 50, or between the negative electrode tab group 25 and the negative electrode electrical collector body 60 (see FIG. 6, or the like). FIG. 7 is a perspective view that shows a spacer main body part 100 used in Embodiment 1. The spacer main body part 100 is configured with a resin material, and is formed in a rod shape (in FIG. 7, approximately triangular prism shape whose corner of the triangle in one cross section view is roundish) as shown in FIG. 7. As the above described resin material, it is possible without particular restriction to use a resin material having the insulating property and the electrolyte-resistant property. In particular, it is possible to use, for example, polyolefin resin (e.g., polypropylene (PP) and polyethylene (PE)), fluorine resin (e.g., perfluoro alkoxy alkane (PFA) and polytetrafluoroethylene (PTFE)), or the like.

In the case where the spacer main body part 100 is arranged at the positive electrode side, the spacer main body part 100 is arranged, for example, as shown in FIG. 6, between the join part J and the positive electrode tab 22t. In more details, the spacer main body part 100 is arranged between the join part J and the positive electrode tab 22t (shown by reference sign 22t1 in FIG. 6) closest to the join part J in the folded and bent state. By arranging the spacer min body part 100 at the portion as described above, it is possible to more efficiently implement the damage suppressing effect on the electrode tab group. Although not particularly restricting, it is preferable to make the spacer main body part 100 and the positive electrode tab 22t abut on each other, in order to more efficiently implement the damage suppressing effect on the electrode tab group. In addition, the case where the spacer main body part 100 is arranged at the negative electrode side is similar to the case where the spacer main body part is arranged at the positive electrode side, and thus the detailed explanation is omitted here.

Figure 8:
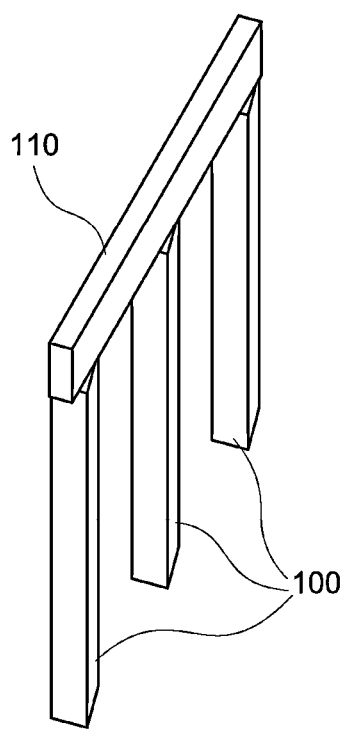
FIG. 8 is a perspective view that shows a spacer used in a modified example of Embodiment 1.

It is preferable for the aspect of including the plurality of electrode bodies 20 in the outer package 12 that a plurality of spacer main body parts 100 are included. At that time, each spacer main body part 100 can be arranged between the positive electrode tab group 23 of each electrode body 20 and the positive electrode electrical collector body 50, or between the negative electrode tab group 25 of each electrode body 20 and the negative electrode electrical collector body 60. In the aspect as described above, one end of each spacer main body part 100 is mutually coupled to one end of another spacer main body part 100 so as to form a coupled part. FIG. 8 is a perspective view that shows a spacer used in a modified example of Embodiment 1. In particular, as shown in FIG. 8, it is possible to use a rod-shaped coupling member 110 so as to mutually couple one end of each spacer main body part 100. By doing this, in the manufacture step for the battery 1 of arranging (inserting) the spacer main body part 100 at a predetermined portion, it is possible to reduce the insertion number of the spacer main body part 100.

Figure 9:
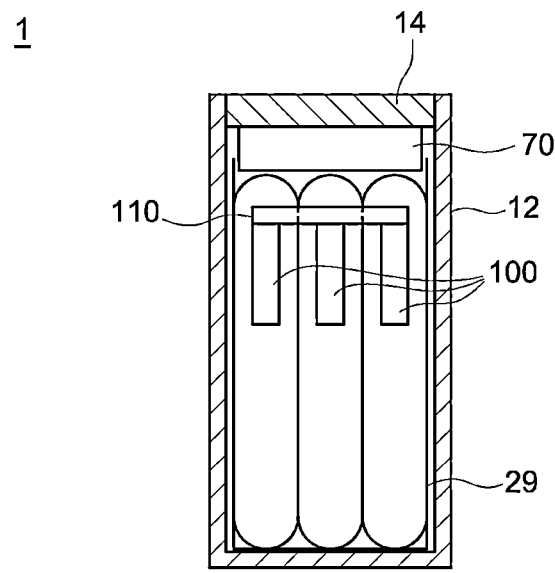
FIG. 9 is a cross sectional view of a battery 1 that is for explaining an arrangement of the spacer according to a modified example of Embodiment 1 and that is viewed from the shorter side wall 12c side of an outer package 12.
Figure 10:
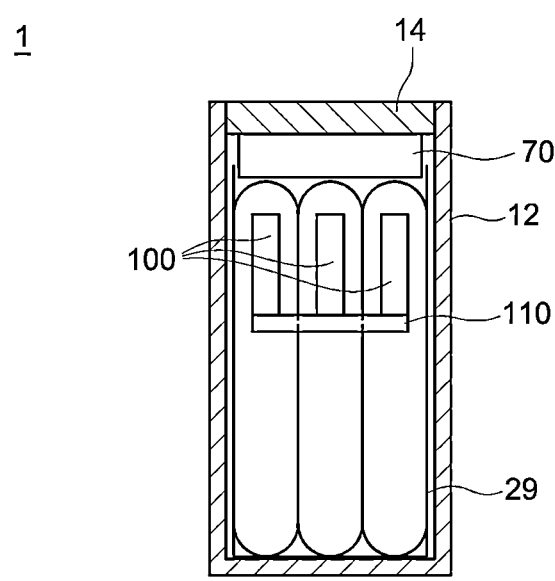
FIG. 10 is a cross sectional view of the battery 1 that is for explaining an arrangement of the spacer according to a modified example of Embodiment 1 and that is viewed from the shorter side wall 12c side of the outer package 12.

FIGS. 9 and 10 each is a cross sectional view of the battery 1 that is for explaining an arrangement of the spacer according to a modified example of Embodiment 1 and that is viewed from the shorter side wall 12c side of an outer package 12. Incidentally, FIGS. 9 and 10 are for explaining the arrangement of the spacer, and illustrations of the electrode tab group and the terminal structure are omitted in these figures. The coupled part (in particular, coupling member 110) can be arranged at the sealing plate 14 side (see FIG. 9) or the bottom wall 12a side (see FIGS. 1 and 10). Both cases can implement the above described effect. In the case where the coupling member 110 is arranged at the sealing plate 14 side, it is possible not only to implement the electrode body 20 movement suppressing effect, which brings the damage suppressing effect for the electrode tab group, but also to implement the effect for suppressing the spacer from falling off.

Incidentally, regarding the aspect of including the plurality of electrode bodies 20 in the outer package 12, it is good to arrange the number of spacer main body parts 100 with respect to the electrode body 20, the number capable of inducing the above described movement suppressing effect for the electrode body 20. In other words, the spacer main body part 100 might be arranged for each of the above described plurality of electrode bodies 20, or the spacer main body part 100 might be arranged for some of the above described plurality of electrode bodies 20 though the spacer main body part 100 might not be arranged for the remaining electrode body 20.

In the above described embodiment, the shape of the spacer main body part 100 is an approximately triangular prism shape, but it is enough for the shape as described above to be capable of induce the above described effect, and thus the shape is not restricted to this. The shape as described above might be, for example, a column shape (semantically including a shape whose cross section view is an oval), or might be a prismatic shape (semantically including an approximately prismatic shape). Alternatively, a member made by folding and bending a resin film (resin sheet) might be used as the spacer main body part 100.

Embodiment 2

Figure 11:
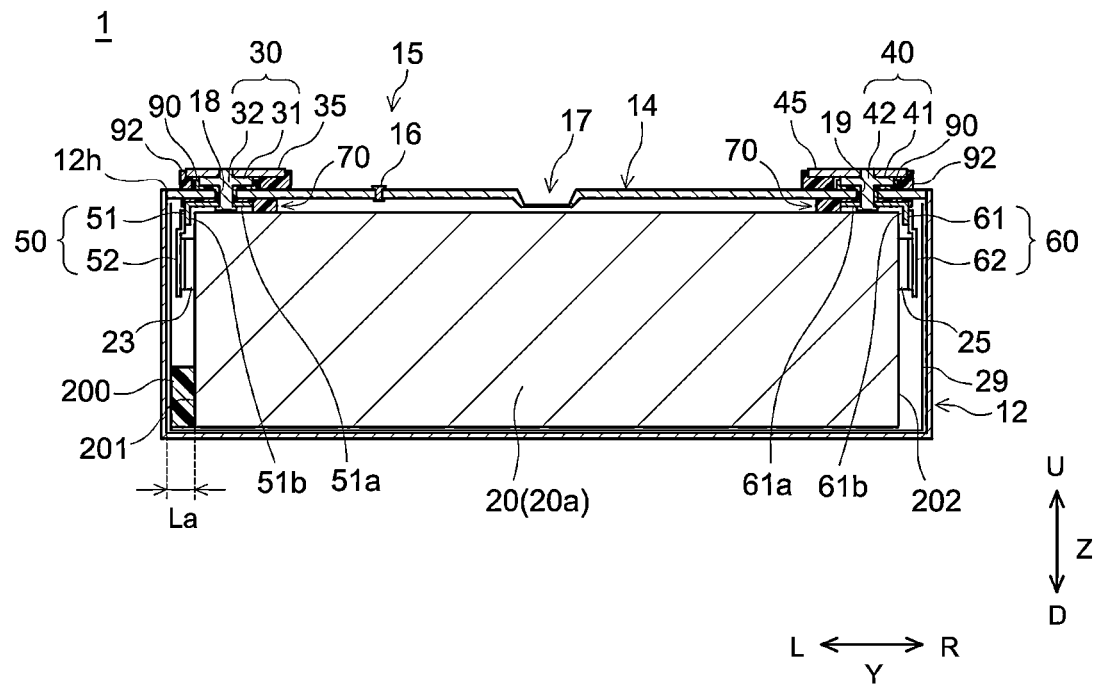
FIG. 11 is a cross sectional view of the battery 1 that is for explaining an arranged portion of a spacer 200 used in Embodiment 2 and that is viewed from the longer side wall 12b side of the outer package 12.

FIG. 11 is a cross sectional view of the battery 1 that is for explaining an arranged portion of a spacer 200 used in Embodiment 2 and that is viewed from the longer side wall 12b side of the outer package 12. In Embodiment 2, the spacer 200 is arranged between the positive electrode tab group 23 and the bottom wall 12a, or between the negative electrode tab group 25 and the bottom wall 12a (between the positive electrode tab group 23 and the bottom wall 12a in FIG. 11, and additionally see FIG. 1). By arranging the spacer at the portion as described above, it is possible to suppress the movement of the electrode body 20 (especially, movement in the width direction Y), so as to suppress the damage on the electrode tab group. The spacer 200 is arranged inside the electrode body holder 29. Here, the spacer 200 might be adhered or welded to the electrode body holder. In this case, as for the adhering means and welding means, a conventionally known means might be used, which is not particularly restricted. In addition, the arranged number of the spacers 200, which is not particularly restricted, might be 1, might be 2, or might be more than 2.

Incidentally, the configuration of the battery in Embodiment 2 is similar to the above described Embodiment 1, except for the portion related to the spacer (portion characterized only in the above described Embodiment 1). Thus, regarding the reference signs in drawings for explaining the present embodiment, reference signs similar to the above described Embodiment 1 might be used. In addition, below, the present embodiment in the case where the spacer 200 is arranged at the positive electrode side (first end part 201 side of the electrode body main body part 20a) will be explained, but the present embodiment in the case where the spacer is arranged at the negative electrode side is also similar, and thus the detailed explanation is omitted. In the below described explanation, FIGS. 1, 2, and 11 are suitably referred.

Figure 12:
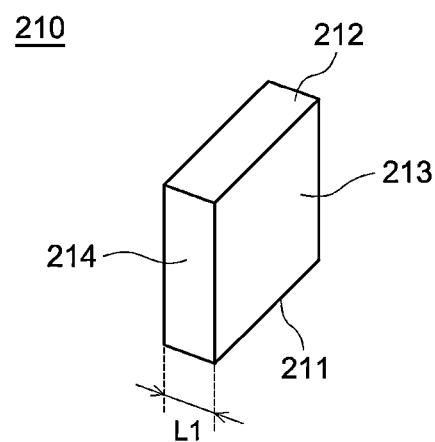
FIG. 12 is a perspective view that shows an example of a spacer used in Embodiment 2.

FIG. 12 is a perspective view that shows an example of the spacer used in Embodiment 2. As shown in FIG. 12, a spacer 210 is formed in a rectangular parallelopiped shape. The spacer 210 includes a rectangular lower end surface 211, a top end surface 212 opposed to this lower end surface, a pair of first side surfaces 213 extending from a pair of long sides of the lower end surface 211, and a pair of second side surfaces 214 extending from a pair of short sides of the lower end surface 211. As an example, the spacer 210 is arranged with one of the first side surfaces 213 opposed to the first end part 201 of the electrode body main body part 20a and with the other one of the first side surfaces 213 opposed to the shorter side wall 12c of the outer package 12. At that time, the lower end surface 211 is opposed to the bottom wall 12a of the outer package 12, and the top end surface 212 is opposed to the sealing plate 14. In addition, the pair of second side surfaces 214 are respectively opposed to the longer side walls 12b of the outer package 12. It is preferable that a ratio (L1/La) with a length La between the inner wall surface of the shorter side wall 12c of the outer package 12 and the first end surface 201 of the electrode body main body part 20a and length L1 of the short side of the lower end surface 211 is set to be 0.75 to 0.9. By setting the above described ratio (L1/La) to be within the predetermined range, it is possible to facilitate inserting the spacer 210 and possible to suitably suppress the movement of the electrode body 20. Incidentally, the above described rectangular parallelopiped shape semantically includes an approximately rectangular parallelopiped shape whose corner is roundish.

Figure 13:
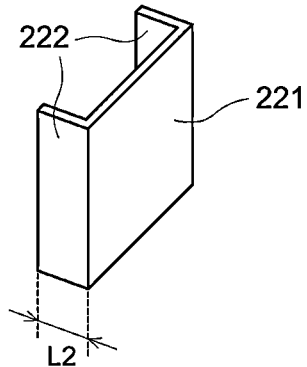
FIG. 13 is a perspective view that shows an example of the spacer used in Embodiment 2.

FIG. 13 is a perspective view that shows an example of the spacer used in Embodiment 2. As shown in FIG. 13, a spacer 220 includes a rectangular plate part 221, and two first erectly provided parts 222 erectly provided in the same direction respectively from a pair of opposed sides of the plate part 221. Two first erectly provided parts 222 are opposed to the longer side walls 12b of the outer package 12. The end parts of these two first erectly provided parts 222 in the erectly provided direction are opposed to the shorter side walls 12c of the outer package 11. By including the spacer 220 formed in the shape as described above, it is possible to implement the suppressing effect for the movement of the electrode body 20 and possible to implement the damage suppressing effect on the electrode tab group. In addition, it is possible to increase the injected liquid amount of the electrolyte. Additionally, the increase speed of the internal pressure in the case where the gas is generated inside the battery case 10 can be reduced.

It is preferable that a ratio (L2/La) with the length La between the inner wall surface of the shorter side wall 12c of the outer package 12 and the first end surface 201 of the electrode body main body part 20a and the length L2 of the first erectly provided part 222 in the above described erectly provided direction is set to be 0.75 to 0.9. By setting the above described ratio (L2/La) to be within the predetermined range, it is possible to facilitate inserting the spacer 220 so as to suitably suppress the movement of the electrode body 20. Incidentally, from the perspective of providing the appropriate rigidity to each part of the spacer 220 so as to secure the space inside the battery case 10, it is preferable to make the thickness (plate thickness) of each part of the spacer 220 be 1 mm to 2 mm.

Figure 14:
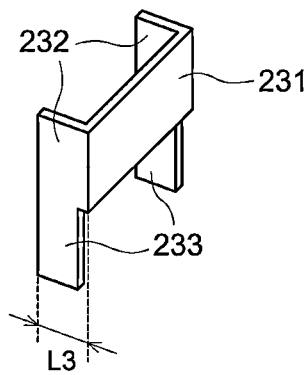
FIG. 14 is a perspective view that shows an example of the spacer used in Embodiment 2.

FIG. 14 is a perspective view that shows an example of the spacer used in Embodiment 2. As shown in FIG. 14, a spacer 230 includes a rectangular plate part 231, and two first erectly provided parts 232 erectly provided in the same direction respectively from a pair of opposed sides of the plate part 231. Further, two first erectly provided parts 232 include extending parts 233 that extend in the extending direction of the above described pair of sides of the plate part 231. Two first erectly provided parts 232 are opposed to the longer side walls 12b of the outer package 12. The end parts of these two first erectly provided parts 232 in the erectly provided direction are opposed to the shorter side walls 12c of the outer package 12. By including the extending parts 233, it is possible not only to implement the action effect brought by the above described spacer 220 but also to further impregnate the electrode body 20 with the electrolyte. The extending part 233 might abut on the bottom wall 12a of the outer package 12.

It is preferable that a ratio (L3/La) with the length La between the inner wall surface of the shorter side wall 12c of the outer package 12 and the first end surface 201 of the electrode body main body part 20a and the length L3 of the first erectly provided part 232 in the above described erectly provided direction is set to be 0.75 to 0.9. By setting the above described ratio (L3/La) to be within the predetermined range, it is possible to facilitate inserting the spacer 230 so as to suitably suppress the movement of the electrode body 20. Incidentally, from the perspective of providing the appropriate rigidity to each part of the spacer 230 so as to secure the space inside the battery case 10, it is preferable to make the thickness (plate thickness) of each part of the spacer 230 be 1 mm to 2 mm.

Figure 15:
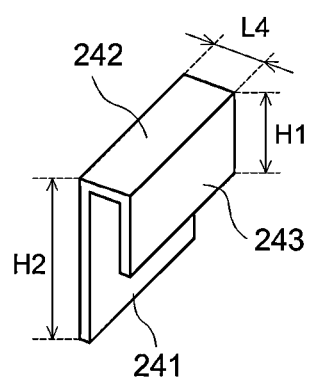
FIG. 15 is a perspective view that shows an example of the spacer used in Embodiment 2.

FIG. 15 is a perspective view that shows an example of the spacer used in Embodiment 2. As shown in FIG. 15, a spacer 240 includes a rectangular plate part 241, second erectly provided part 242 erectly provided from one side of the plate part 241, and a supporting plate part 243 extending from the second erectly provided part 242 in a direction parallel to the plate part 241. The plate part 241 and the supporting plate part 243 are mutually opposed. A length H1 of the supporting plate part 243 in a direction where the supporting plate part 243 extends is shorter than the length H2 of the plate part 241 in the same direction. The spacer 240 including the structure as described above has a spring property. By using the spacer 240, it is possible to implement the suppressing effect for the movement of the electrode body 20 and possible to implement the damage suppressing effect on the electrode tab group. Although not particularly restricting, from the perspective of further impregnating the electrode body 20 with the electrolyte, it is preferable that the second erectly provided part 242 is arranged at the sealing plate 14 side. In addition, from the similar perspective, although not particularly restricting, it is preferable that the plate part 241 is opposed to the shorter side wall 12c of the outer package 12 and the supporting plate part 243 is opposed to the electrode body main body part 20a (e.g., first end surface 201). The end part of the plate part 241 in the height direction Z of the battery 1 might abut on the bottom wall 12a of the outer package 12.

It is preferable that a ratio (L4/La) with the length La between the inner wall surface of the shorter side wall 12c of the outer package 12 and the first end surface 201 of the electrode body main body part 20a and the length L4 of the second erectly provided part 242 in the above described erectly provided direction is set to be 0.75 to 0.9. By setting the above described ratio (L4/La) to be within the predetermined range, it is possible to facilitate inserting the spacer 240 so as to suitably suppress the movement of the electrode body 20. Incidentally, from the perspective of providing the appropriate rigidity to each part of the spacer 240 so as to secure the space inside the battery case 10, it is preferable to make the thickness (plate thickness) of each part of the spacer 240 be 1 mm to 2 mm.

Embodiment 3

Figure 16:
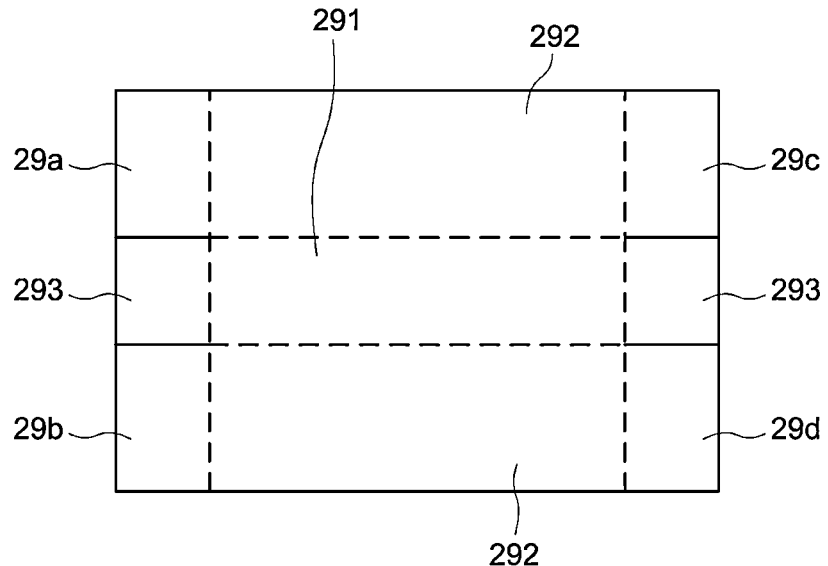
FIG. 16 is a development view of an electrode body holder 290 in accordance with Embodiment 3.

In Embodiment 3, a battery holder (see FIG. 2 or the like) is provided that accommodates one or a plurality of electrode bodies 20 accommodated inside the battery case 10. The battery holder in accordance with the present embodiment is what a resin-made film formed in a shape shown in FIG. 16 (e.g., film made of resin, such as polyethylene (PE)) is folded and bent and is shaped. FIG. 16 is a development view of an electrode body holder 290 in accordance with Embodiment 3. As shown in FIG. 16, the electrode body holder 290 in an expanded state includes a rectangular bottom surface 291, a pair of width wide surfaces 292 extending from a pair of opposed long sides of the bottom surface 291, a pair of bottom surface adjacent parts 293 extending from a pair of opposed short sides of the bottom surface 291, and a width narrow surface forming parts 29a to 29d extending from short sides of each width wide surfaces 292. By making this be folded and bent in the same direction along the dotted line in FIG. 16, the electrode body holder 290 is shaped.

The electrode body holder 290 in a shaped state includes an internal space that accommodates one or the plurality of electrode bodies 20. The electrode body holder 290 includes an opening part that communicates with the above described internal space. The electrode body holder 290 includes a rectangular bottom surface 291 opposed to the above described opening part, a pair of width wide surfaces 292 extending from the bottom surface 291 and being mutually opposed, and a pair of width narrow surfaces extending from the bottom surface 291 and being mutually opposed. In FIGS. 17 and 19 to 21 described later, the reference sign 294 is applied to the width narrow surface. Here, one of width narrow surfaces is configured with width narrow surface forming parts 29a, 29b and a bottom surface adjacent part 293. In particular, for example, the bottom surface adjacent part 293 is firstly folded and bent. Next, the width narrow surface forming part 29a is folded and bent, and then is put on the folded and bent bottom surface adjacent part 293. Next, the width narrow surface forming part 29b is folded and bent, and then is put on the folded and bent width narrow surface forming part 29a. By doing this, it is possible to form the above described one of the width narrow surfaces. At that time, the resin-made film shown in FIG. 16 is folded and bent to make the bottom surface adjacent part 293, the width narrow surface forming part 29a, and the width narrow surface forming part 29b be overlaid in this order from the inside to the outside of the electrode body holder 290. In addition, the other one of width narrow surfaces is configured with width narrow surface forming parts 29c, 29d and the bottom surface adjacent part 293. In particular, for example, the bottom surface adjacent part 293 is firstly folded and bent. Next, the width narrow surface forming part 29c is folded and bent, and then is put on the folded and bent bottom surface adjacent part 293. Next, the width narrow surface forming part 29d is folded and bent, and then is put on the folded and bent width narrow surface forming part 29c. By doing this, it is possible to form the above described other one of the width narrow surfaces. At that time, the above described resin-made film is folded and bent to make the bottom surface adjacent part 293, the width narrow surface forming part 29c, and the width narrow surface forming part 29d be overlaid in this order from the inside to the outside of the electrode body holder 290.

At least one of the pair of width narrow surfaces includes a spacer regulating the movement of the electrode body holder 290 inside the electrode body holder 290. The electrode body holder 290 configured as described above includes the spacer on the width narrow surface, and thus it is possible to suppress the movement of the electrode body arranged on the electrode body holder 290 and possible to suppress the damage on the electrode tab group. Incidentally, spacers might be arranged on the both of the pair of width narrow surfaces. Below, some examples will be shown and explained. Incidentally, in FIGS. 17 and 19 to 21 referred below, arrows representing the direction X and the direction Z are shown in consideration of the case where the electrode body holder 290 is arranged in the battery 1.

Figure 17:
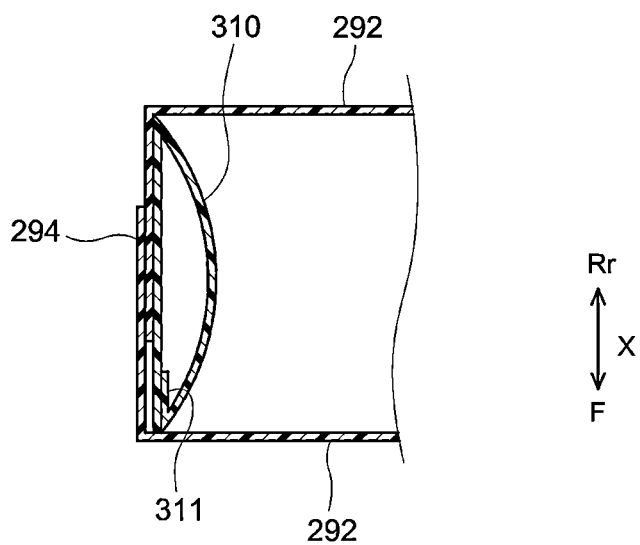
FIG. 17 is a partial cross-section view that shows an example of the electrode body holder 290 in accordance with Embodiment 3 and that is viewed from the opening part side of the electrode body holder.
Figure 18:
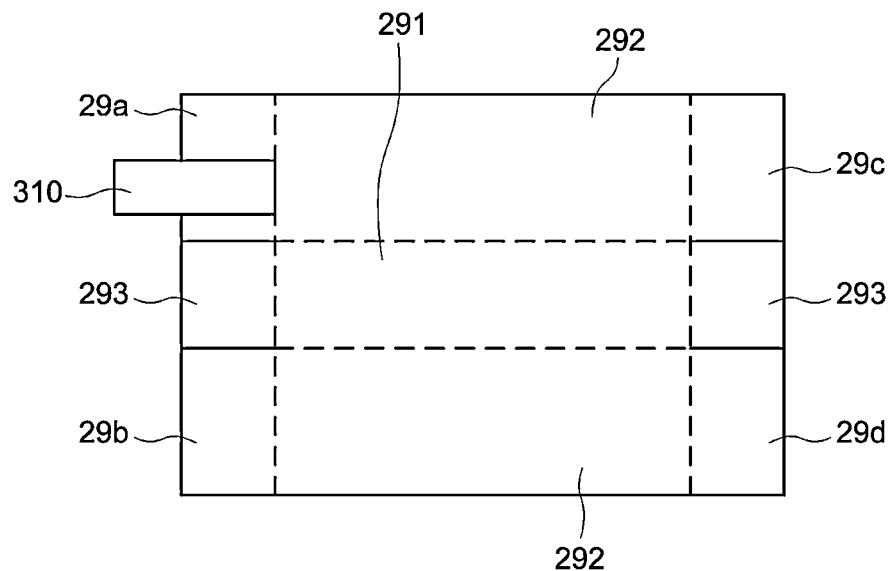
FIG. 18 is a part of the development view of the electrode body holder 290 shower in FIG. 17.

FIG. 17 is a partial cross-section view that shows an example of the electrode body holder 290 in accordance with Embodiment 3 and that is viewed from the opening part side of the electrode body holder. FIG. 18 shows a part of the development view of the electrode body holder 290 shown in FIG. 17. As shown in FIG. 17, the spacer 310 is adjacent to a portion of the resin-made film (see FIGS. 16 and 18, too) configuring the width wide surface 292 of the electrode body holder 290, and is formed with at least a part of the width narrow surface forming part, forming the width narrow surface 294, that is folded and bent inward of the electrode body holder 290 (see FIGS. 16 and 18, too). In particular, for example, as shown in FIG. 18, it is preferable to additionally provide a resin film for forming the spacer 310 at a predetermined site of the width narrow surface forming part 29a. By folding and bending the width narrow surface forming part 29a to make the portion shown with the reference sign 310 in FIG. 18 position innermost of the electrode body holder 290 and then by fixing the end part of the portion shown with the reference sign 310 to the inside surface of the electrode body holder 290 (forming of the fixing part 311 in FIG. 17), it is possible to form the spacer 310. By forming the spacer 310, it is possible to suppress the movement of the electrode body accommodated in the electrode body holder 290. Regarding the above described fixing means, which is not particularly restricted, it is possible to use a conventionally known adhering means or welding means.

Figure 19:
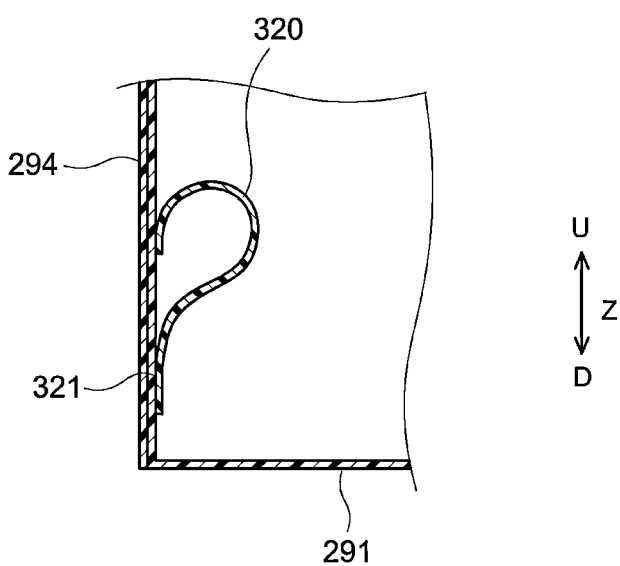
FIG. 19 is a partial cross-section view that shows an example of the electrode body holder 290 in accordance with Embodiment 3, and that is viewed from the width wide surface side of the electrode body holder.

FIG. 19 is a partial cross-section view that shows an example of the electrode body holder 290 in accordance with Embodiment 3, and that is viewed from the width wide surface side of the electrode body holder. As shown in FIG. 19, the spacer 320 is formed with at least a part of the bottom surface adjacent part 293 of the resin-made film adjacent to the portion configuring the bottom surface 291 of the electrode body holder 290, while said at least a part is folded and bent inward the electrode body holder 290 (see FIG. 16, too). In particular, when the resin-made film shown in FIG. 16 is folded and bent to form the width narrow surface 294, the bottom surface adjacent part 293 is folded and bent along the dotted line, then the bottom surface adjacent part 293 is bent inward of the electrode body holder 290, and then the end part is fixed to the inside surface of the electrode body holder 290 (forming of the fixing part 321 in FIG. 19), so that the spacer 320 can be formed. By forming the spacer 320, it is possible to suppress the movement of the electrode body accommodated in the electrode body holder 290 and possible to suppress the damage on the electrode tab group. In addition, it is possible to perform the press to the electrode body more uniformly by the spacer. Incidentally, the size of the spacer 320 can be adjusted by suitably extending the bottom surface adjacent part 293 in a direction along the long side of the bottom surface 291. In addition, regarding the above described fixing means, which is not particularly restricted, it is possible to use a conventionally known adhering means or welding means.

Figure 20:
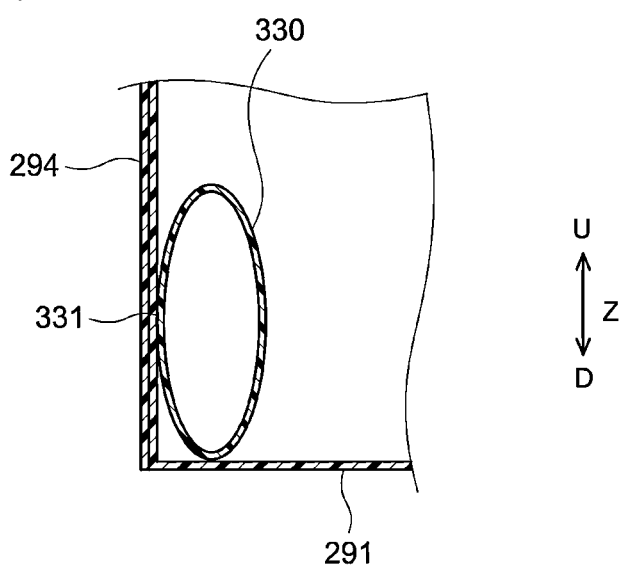
FIG. 20 is a partial cross-section view that shows an example of the electrode body holder 290 in accordance with Embodiment 3, and that is viewed from the width wide surface side of the electrode body holder.
Figure 21:
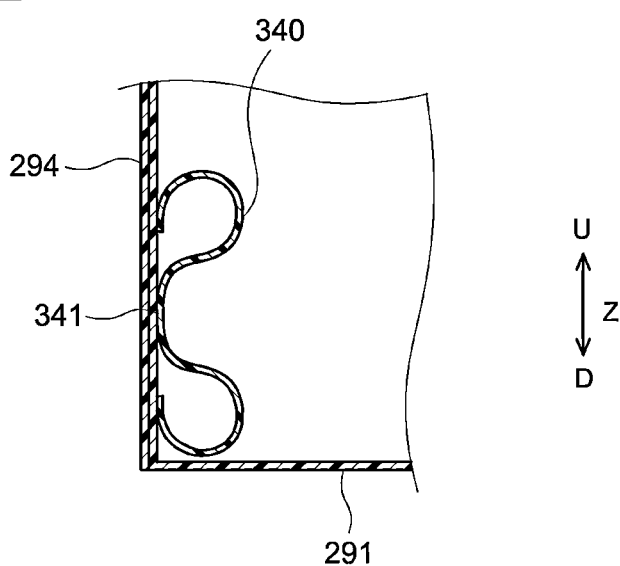
FIG. 21 is a partial cross-section view that shows an example of the electrode body holder 290 in accordance with Embodiment 3, and that is viewed from the width wide surface side of the electrode body holder.

Alternatively, the spacer might be configured by using another resin sheet different from the resin film configuring the electrode body holder 290. FIGS. 20 and 21 each is a partial cross-section view that shows an example of the electrode body holder 290 in accordance with Embodiment 3, and that is viewed from the width wide surface side of the electrode body holder. The spacer 330 shown in FIG. 20 is what another resin sheet as described above is used to be formed in a cylindrical shape. Although not particularly restricting, a part of the spacer 330 might be fixed to the width narrow surface 294 (forming of the fixing part 331 in FIG. 20). In addition, although not particularly restricting, a part (for example, central part in the direction where the width narrow surface 294 extends from the bottom surface 291) of the spacer formed in the cylindrical shape as the spacer 340 shown in FIG. 21 might be crushed to the width narrow surface 294 side so as to be fixed to the width narrow surface 294 (forming of the fixing part 341 in FIG. 21). By forming the spacer as described above, it is possible to suppress the movement of the electrode body accommodated in the electrode body holder 290 and possible to suppress the damage on the electrode tab group. In addition, the configuration material of the electrode body holder 290 and the configuration material of the spacer 330 or spacer 340 can be different. Further, it is possible to more easily adjust the thickness of the spacer.

The above described electrode body holder 290 can be used as an electrode body holder of a battery that includes one or a plurality of electrode bodies and that includes an electrode body holder accommodating the electrode bodies. For example, instead of the electrode body holder 29 of the battery 1 in Embodiment 1 shown by FIG. 2 or the like, the above described electrode body holder 290 can be used. In particular, to make the bottom surface 291 of the electrode body holder 290 and the bottom wall 12a of the outer package 12 be opposed, to make the width wide surface 292 of the electrode body holder 290 and the longer side wall 12b of the outer package 12 be opposed, and to make the width narrow surface of the electrode body holder 290 and the shorter side wall 12c of the outer package 12 be opposed, the electrode body holder 290 can be accommodated in the outer package 12 and then used. By using the electrode body holder 290, it is possible to suppress the movement of the electrode body accommodated at the inside and possible to suppress the damage on the electrode tab group, incidentally, the configuration of the battery in Embodiment 3 is similar to the above described Embodiment 1, except for the portions related to the electrode body holder and the spacer.

Up to this point, a detailed description has been given by way of specific embodiments about the herein disclosed technique, which are merely illustrative, and is not construed as limiting the scope of the appended claims. The technology according to the appended claims includes various modifications and changes of the embodiments described up to this point.

What is claimed is:

1. A battery comprising:
    an outer package that comprises:
        a bottom wall;
        a pair of first side walls extending from the bottom wall and being mutually opposed;
        a pair of second side walls extending from the bottom wall and being mutually opposed; and
        an opening part opposed to the bottom wall;
    a sealing plate that seals the opening part;
    electrode bodies that are accommodated in the outer package and that each electrode body comprises a positive electrode and a negative electrode;
    a positive electrode terminal and a negative electrode terminal that are attached to the sealing plate;
    a positive electrode electrical collector body that electrically connects the positive electrode of the electrode body and the positive electrode terminal; and
    a negative electrode electrical collector body that electrically connects the negative electrode of the electrode body and the negative electrode terminal,
    wherein the electrode body comprises:
        an electrode body main body part;
        a positive electrode tab group that comprises a plurality of positive electrode tabs protruding from a first end part of the electrode body main body part in a first direction along the first side wall; and
        a negative electrode tab group that comprises a plurality of negative electrode tabs protruding from a second end part of the electrode pair main body part in the first direction, the second end part being different from the first end part,
        the positive electrode tab group is folded and bent to arrange respective tip ends of the positive electrode tabs configuring the positive electrode tab group along the second side wall,
    a portion of the folded and bent positive electrode tabs is joined to the positive electrode electrical collector body,
    the negative electrode tab group is folded and bent to arrange respective tip ends of the negative electrode tabs configuring the negative electrode tab group along the second side wall,
    a portion of the folded and bent negative electrode tabs is joined to the negative electrode electrical collector body, and
    a spacer is provided between the electrode body main body part and the second side wall that regulates movement of the electrode body,
    the spacer comprises spacer main body parts and a coupled part which couples the spacer main body parts,
    each spacer main body part is arranged between the positive electrode tab group of each electrode body and the positive electrode electrical collector body, or between the negative electrode tab group of each electrode body and the negative electrode electrical collector body,
    the coupled part mutually couples one end of respective spacer main body parts.

2. The battery according to claim 1, wherein the one end of respective spacer main body parts is mutually coupled by the coupled part, and
    another end of respective spacer main body parts is not mutually coupled by the coupled part.

3. The battery according to claim 1,
    wherein each positive electrode tab group is folded in a same direction, and
    each negative electrode tab group is folded in a same direction.

4. The battery according to claim 1,
    wherein the coupled part is arranged at a side of the sealing plate or a side of the bottom wall.

5. The battery according to claim 1, wherein
    the spacer is arranged between the positive electrode tab group and the bottom wall, or between the negative electrode tab group and the bottom wall.

6. The battery according to claim 5,
    wherein the spacer is formed in a rectangular parallelopiped shape.

7. The battery according to claim 5,
    wherein the spacer comprises:
        a plate part being rectangular; and
        two first erectly provided parts being erectly provided in a same direction respectively from a pair of opposed sides of the plate part,
    the two first erectly provided parts are opposed to the first side wall, and
    end parts of the two first erectly provided parts in an erectly provided direction are opposed to the second side wall.

8. The battery according to claim 7,
    wherein the two first erectly provided parts comprise extending parts that extend in an extending direction of the pair of sides of the plate part.

9. The battery according to claim 5,
    wherein the spacer comprises:
        a plate part that is rectangular;
        a second erectly provided part that is erectly provided from a side of the plate part; and a supporting plate part that extends in a direction parallel to the plate part from the second erectly provided part, a length of the supporting plate part in a direction where the supporting plate part extends is shorter than a length of the plate part in a same direction, the second erectly provided part is arranged at the side of the sealing plate, the plate part is opposed to the second side wall, and the supporting plate part is opposed to the electrode body main body part.

10. The battery according to claim 5, wherein the spacer is arranged away from the positive electrode electrical collector body or the negative electrode electrical collector body in a direction vertical to the bottom wall.

11. The battery according to claim 5, wherein a ratio (L1/La) with a length La between an inner wall surface of the second side wall and a first end surface of the electrode body main body part and a thickness L1 of the spacer is set to be 0.75 to 0.9.

12. The battery according to claim 1, wherein the coupled part is integral with the spacer main body parts.

* * * * *